(12) United States Patent
Maggioni et al.

(10) Patent No.: US 8,206,060 B2
(45) Date of Patent: Jun. 26, 2012

(54) SHEET-LIKE ELEMENT FOR REINFORCING, SEPARATING AND DRAINING LARGE STRUCTURES, SUCH AS ROAD EMBANKMENTS

(75) Inventors: Pierluigi Maggioni, Barzano (IT); Casare Beretta, Lomagna (IT)

(73) Assignee: Tenax, S.p.A., Vigano' (IT)

( * ) Notice: Subject to any disclaimer, the term of this patent is extended or adjusted under 35 U.S.C. 154(b) by 121 days.

(21) Appl. No.: 12/709,804

(22) Filed: Feb. 22, 2010

(65) Prior Publication Data
US 2010/0247239 A1   Sep. 30, 2010

(30) Foreign Application Priority Data
Mar. 31, 2009   (IT) .............................. MI2009A0508

(51) Int. Cl.
  *E01C 5/08* (2006.01)
(52) U.S. Cl. ........................................ 404/70; 405/302.7
(58) Field of Classification Search .................... 404/28, 404/70; 405/302.7
See application file for complete search history.

(56) References Cited

U.S. PATENT DOCUMENTS

| | | | | |
|---|---|---|---|---|
| 4,374,798 A * | 2/1983 | Mercer | ........................ | 264/288.8 |
| 5,267,816 A * | 12/1993 | Mercer et al. | ............... | 405/302.7 |
| 5,419,659 A * | 5/1995 | Mercer | ........................ | 405/302.7 |
| 5,735,640 A * | 4/1998 | Meyer et al. | ............... | 405/302.7 |
| 5,836,715 A * | 11/1998 | Hendrix et al. | ............... | 404/134 |
| 5,851,089 A * | 12/1998 | Beretta | ........................ | 405/259.1 |
| 5,891,549 A * | 4/1999 | Beretta et al. | ............... | 428/100 |
| 6,123,879 A * | 9/2000 | Hendrix et al. | ............... | 264/31 |
| 6,454,889 B1 * | 9/2002 | Hendrix et al. | ............... | 156/71 |
| 6,708,362 B1 * | 3/2004 | Allen | ........................ | 14/73 |
| 7,168,884 B2 * | 1/2007 | Hart | ........................ | 404/29 |
| 8,109,696 B2 * | 2/2012 | Maggioni | ............... | 405/302.7 |
| 2002/0014619 A1 | 2/2002 | Christensen | | |
| 2007/0218789 A1 * | 9/2007 | Maggioni | ............... | 442/2 |
| 2010/0067991 A9 * | 3/2010 | Maggioni | ............... | 405/302.7 |

FOREIGN PATENT DOCUMENTS

| | | |
|---|---|---|
| DE | 20 2006 011394 U1 | 10/2006 |
| DE | 20 2007 010716 U1 | 12/2008 |
| EP | 0 120 795 A1 | 10/1984 |

OTHER PUBLICATIONS

Italian Search Report dated Dec. 17, 2009 from priority Italian Application MI2009A000508.

* cited by examiner

*Primary Examiner* — Gary S Hartmann
(74) *Attorney, Agent, or Firm* — Greer, Burns & Crain, Ltd.

(57) ABSTRACT

A sheet-like element for reinforcing, separating and draining large structures such as road embankments. The element includes a sheet-like body which has a lattice like configuration with main wires and transverse wires stretched respectively along two mutually substantially perpendicular directions and that intersect in nodes. The main extend in the extrusion direction of the blank. The main wires have an upper rim and a pair of substantially vertical lateral walls extending downwardly from the upper rim at opposite ends of said upper rim. The main wires have a lower rim in regions remote from the nodes. The main wires have a lower portion in regions at the nodes which converge with the transverse wires.

6 Claims, 7 Drawing Sheets

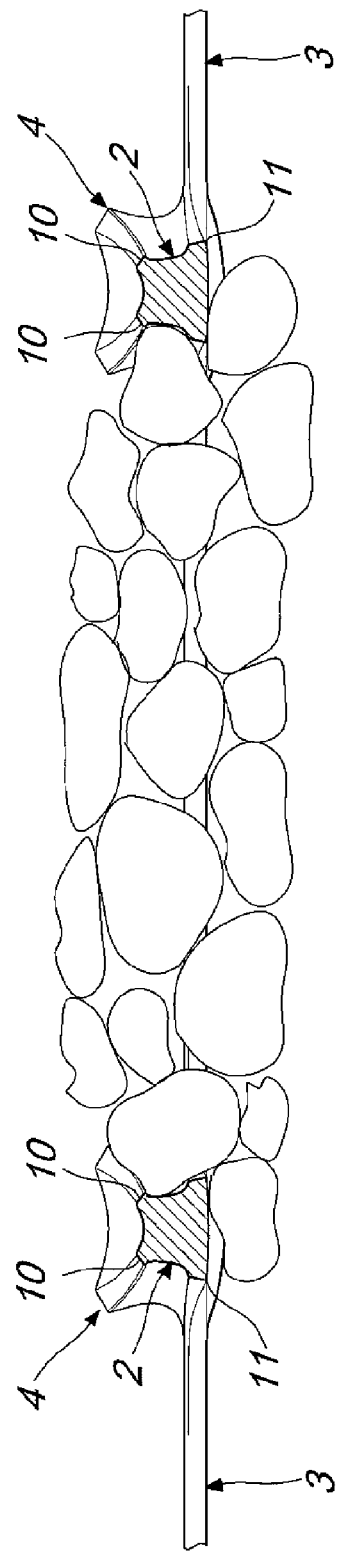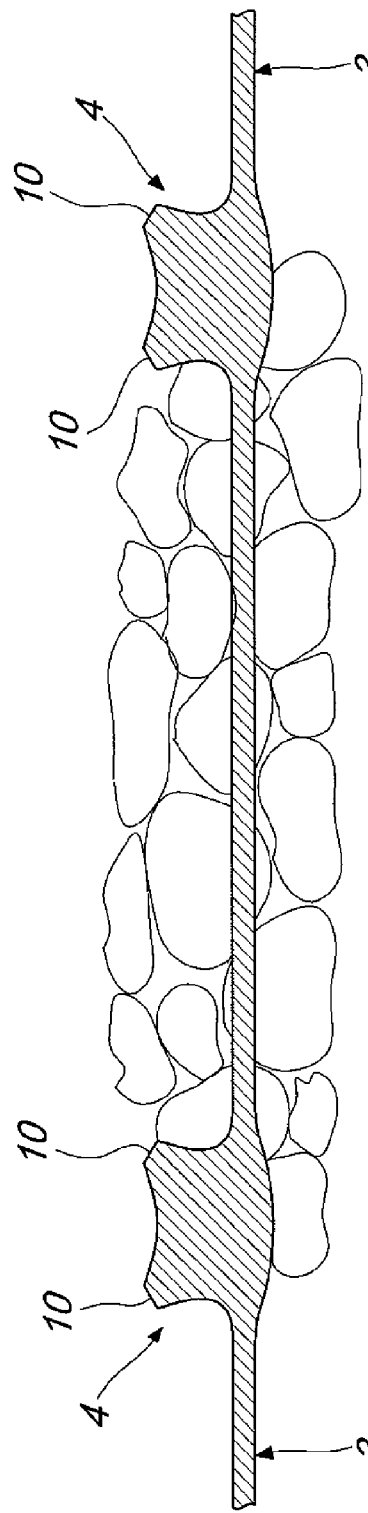

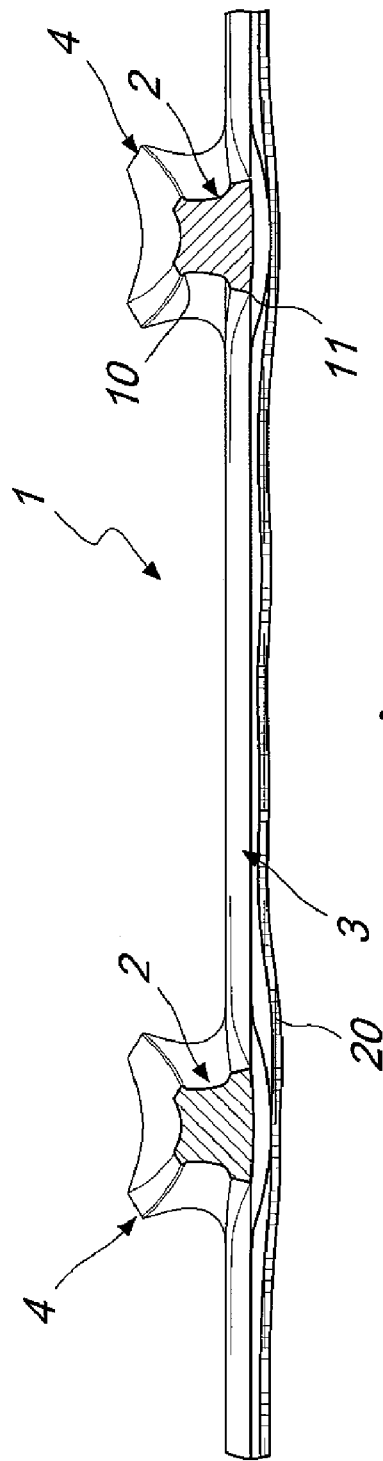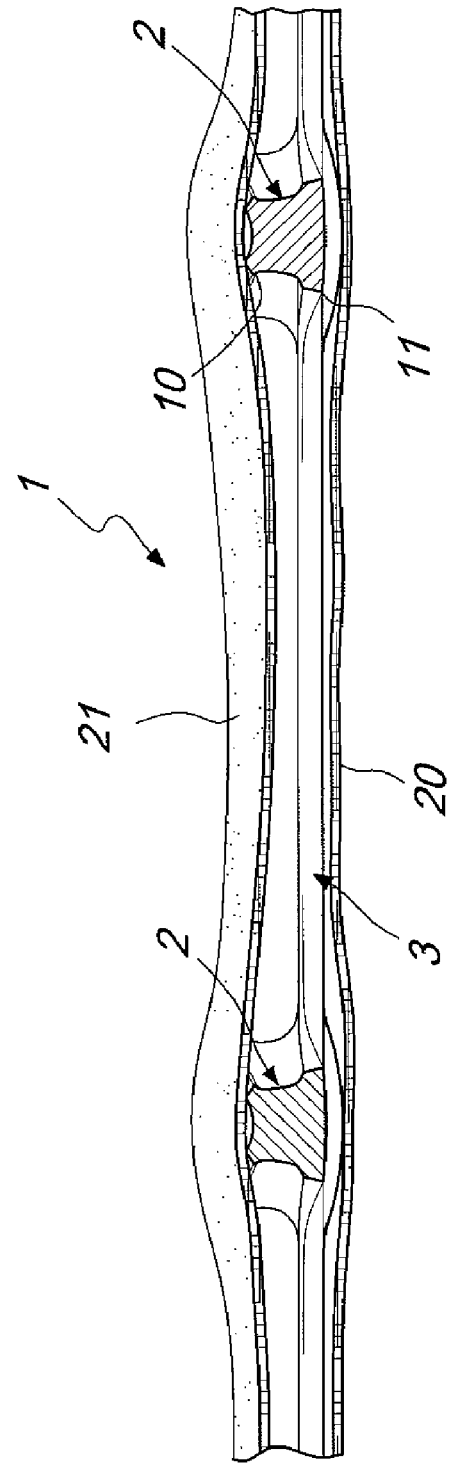

SHEET-LIKE ELEMENT FOR REINFORCING, SEPARATING AND DRAINING LARGE STRUCTURES, SUCH AS ROAD EMBANKMENTS

The present invention relates to a sheet-like element for reinforcing, separating and draining large structures, such as road embankments.

BACKGROUND OF THE INVENTION

As is known, during the provision of carriage ways, paved or unpaved, on soft or saturated ground, it is necessary to prevent sagging which creates severe traffic problems.

The base layer, consisting of compact granular material which is optionally cemented, can in fact be damaged and can sink deeply into the foundation soil, or deformations or horizontal and vertical movements at the base can occur which can cause the formation of grooves and troughs.

In order to avoid these phenomena, it is common practice to interpose between the embankment and the foundation soil one or more layers of biosynthetic reinforcement products, which are designed to distribute the load and ensure the safety factor required for the structure.

The technique of reinforcing the roadbed of the traditional type or of the suspended type, as in the case of viaducts, bridges, ramps and the like, by means of lattice-like elements such as metallic grids, nets made of plastics or high-strength fabric, is increasingly adopted in small and large civil infrastructures, prompting designers to review with new concepts the construction phase in order to improve the stability and strength of the various construction layers.

The solutions currently used are not always able to solve the problem, since anchoring the net in the ground is not always effective, with the possibility that the load produced by the transit of traffic, including heavy traffic, may lead to a destabilization of the placement of the net, with the possibility of its extraction from the foundation.

SUMMARY OF THE INVENTION

The aim of the invention is to solve the problem described above, by providing a sheet-like element for reinforcing, separating and draining large structures, such as road embankments, which has a higher friction between said sheet-like element and the filler material, thus facilitating the anchoring of the sheet-like element to the ground and consequently allowing greater loads without damage.

Within this aim, an object of the invention is to provide a sheet-like element that has a tendency to jam with respect to the filler material, so that the force needed to disengage the sheet-like element from its arrangement is increased with respect to the force required to disengage the sheet-like element of the solutions of the background art.

Another object of the present invention is to provide a sheet-like element for reinforcing, separating and draining large structures, such as road embankments, which thanks to its particular constructive characteristics is capable of giving the highest guarantees of reliability and safety in use.

Another object of the present invention is to provide a sheet-like element that can be obtained easily starting from commonly commercially available elements and materials and is also competitive from a merely economic point of view.

This aim and these and other objects which will become better apparent hereinafter are achieved by a sheet-like element for reinforcing, separating and draining large structures such as road embankments, according to the invention, comprising a sheet-like body which has a lattice-like configuration with main wires and transverse wires stretched along two mutually substantially perpendicular directions, characterized in that said main wires, i.e., in the extrusion direction of the blank that provides said sheet-like body, have a substantially quadrangular cross-section and a thickness, in a direction that lies at right angles to the plane of arrangement of said sheet-like body, which is equal to at least three times the thickness of said transverse wires.

BRIEF DESCRIPTION OF THE DRAWINGS

Further characteristics and advantages of the present invention will become better apparent from the description of a preferred but not exclusive embodiment of a sheet-like element for reinforcing, separating and draining large structures, such as road embankments, illustrated by way of non-limiting example with the aid of the accompanying drawings, wherein:

FIG. 6 is a sectional view of the element, taken along the line that is perpendicular to the main wires at a central plane of the meshes;

FIG. 7 is a sectional view, taken at the nodes in a direction that lies at right angles to the extension of the main wires;

FIG. 10 is a sectional view, taken along the line X-X of FIG. 8;

FIG. 11 is a sectional view, taken along the line XI-XI of FIG. 9.

DESCRIPTION OF THE PREFERRED EMBODIMENTS

Figure 1:
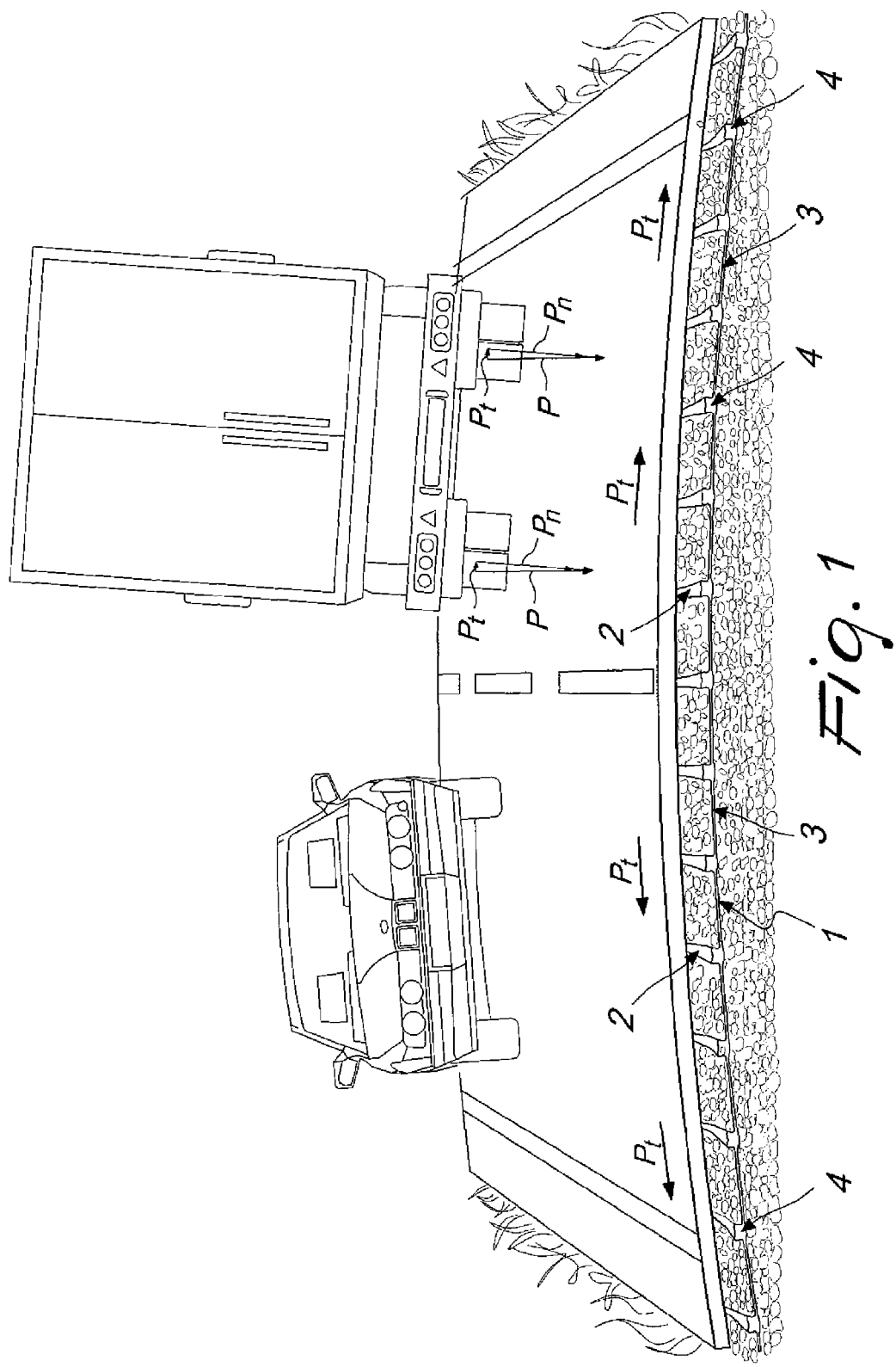
FIG. 1 is a schematic sectional view of a road with the sheet-like element according to the invention arranged thereat.
Figure 2:
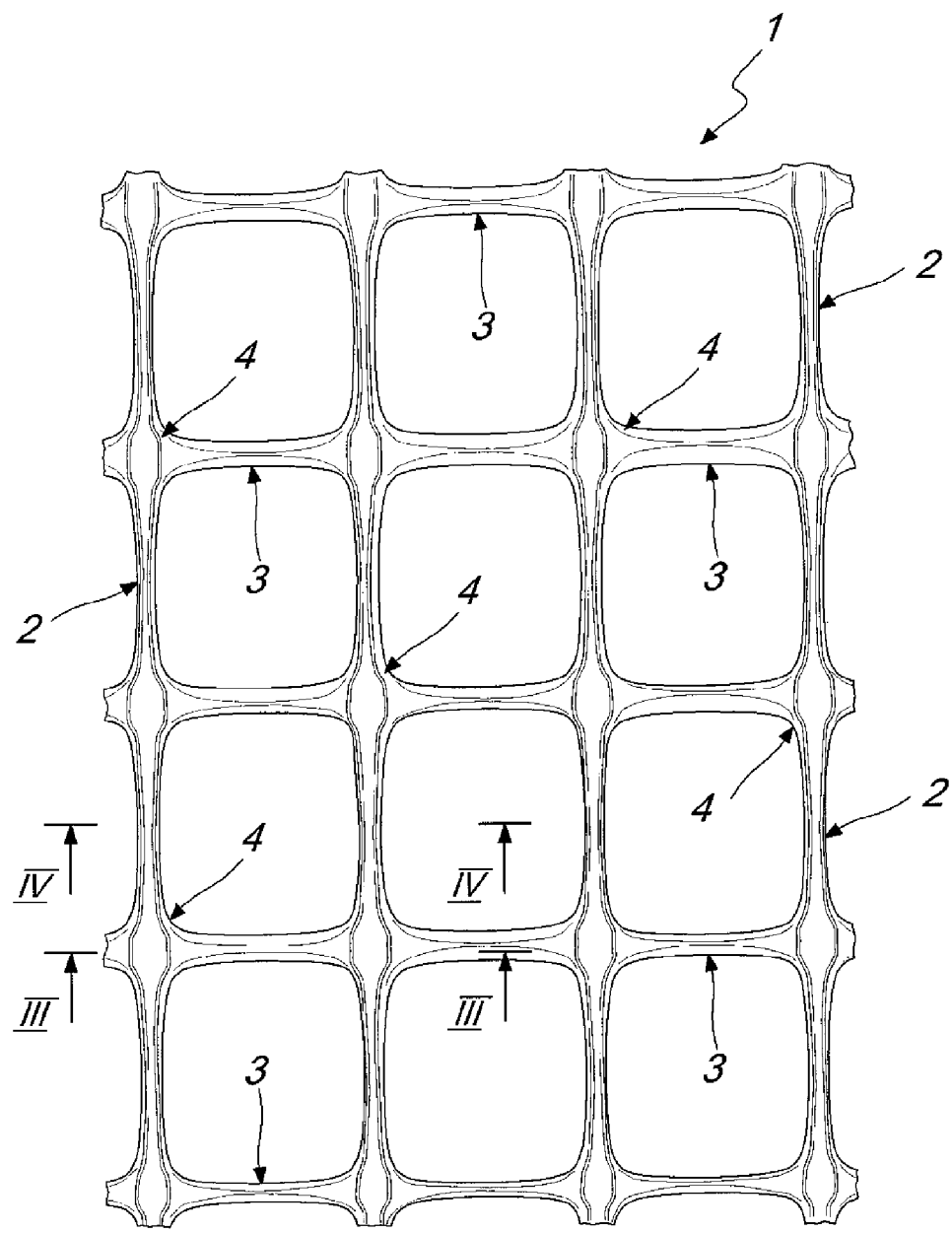
FIG. 2 is a plan view of the sheet-like element.

With reference to the figures, the sheet-like element for reinforcing, separating and draining large structures, such as road embankments, comprises a sheet-like body, generally designated by the reference numeral 1, which has a lattice-like configuration with main wires 2 and transverse wires 3, which are stretched along directions which are mutually substantially perpendicular. More particularly, the main wires lie along the direction of extrusion of the blank that provides the sheet-like body 1, whereas the transverse wires are substantially perpendicular.

The wires 2 and 3 cross at the nodes 4 and, as usual, are oriented, i.e., stretched in two mutually perpendicular directions.

Substantially, the sheet-like body is provided by means of two sets of crossed wires which are mutually tied together to form a single piece extruded element, preferably but not necessarily made of polypropylene, which is a plastic material that can provide low weight and good stiffness, together with resistance to atmospheric agents and temperature variations, with the possibility of being completely recycled in case of disposal.

In particular, the main wires 2 have, in a transverse cross-section, a substantially quadrangular configuration, whereas the transverse wires 3 have a flatter and wider shape, and therefore there is an important flexural stiffness when the main wires are subjected to stress, whereas the transverse wires are more easily flexible.

Preferably, the stretch ratio in the main direction and in the transverse direction is comprised between 2.8 and 5.5.

The main wires, which are oriented in the extrusion direction, are clearly defined in their shape and have the peculiarity of having, at their upper rim that protrudes with respect to the node 4, substantially sharp upper edges, designated by the reference numeral 10, and likewise there are substantially sharp lower edges 11, which are provided at the lower rim.

The thickness of the main wire at the node is at least three times greater than the thickness of the transverse wire 3 measured along the direction that is perpendicular to the plane of arrangement of the sheet-like element.

In the regions that are remote from the node, the thickness must be at least two times greater.

The transverse cross-section of the main wire, which as mentioned earlier has clearly distinguishable edges at the end of the wire, has dimensions comprised between 8×6 millimeters and 8×8 millimeters.

The presence of the sharp edges is a critical element in the specific case for the performance of the product in case of tangent sliding with respect to the ground, and this is an essential element also on the basis of the mechanical tests that have been carried out.

Figure 3:
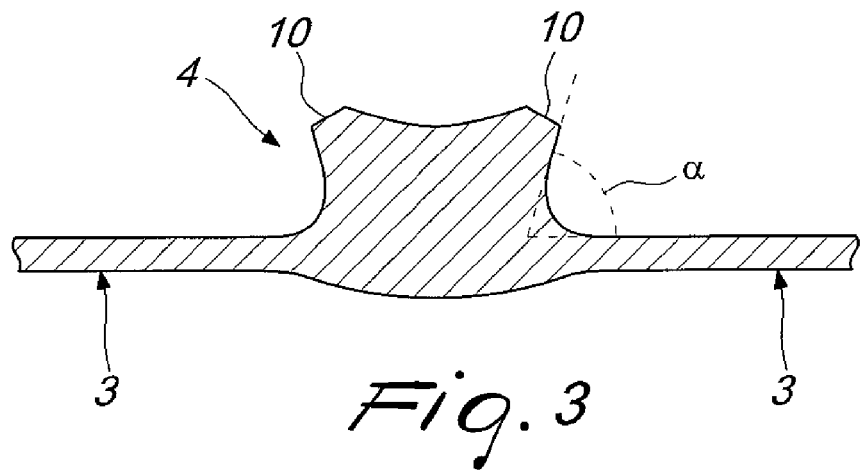
FIG. 3 is a sectional view, taken along the line III-III of FIG. 2.
Figure 4:
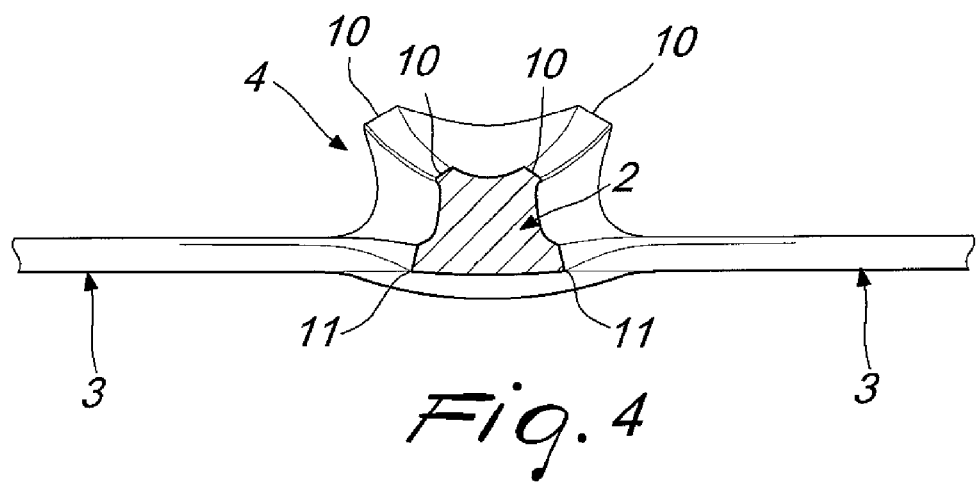
FIG. 4 is a sectional view, taken along the line IV-IV of FIG. 2.
Figure 5:
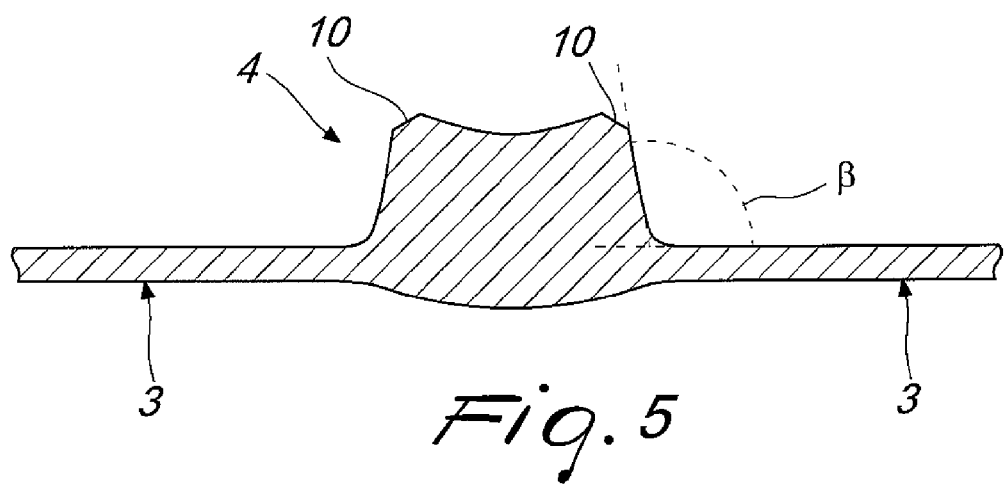
FIG. 5 is a sectional view, taken at the node, of a different embodiment.
Figure 8:
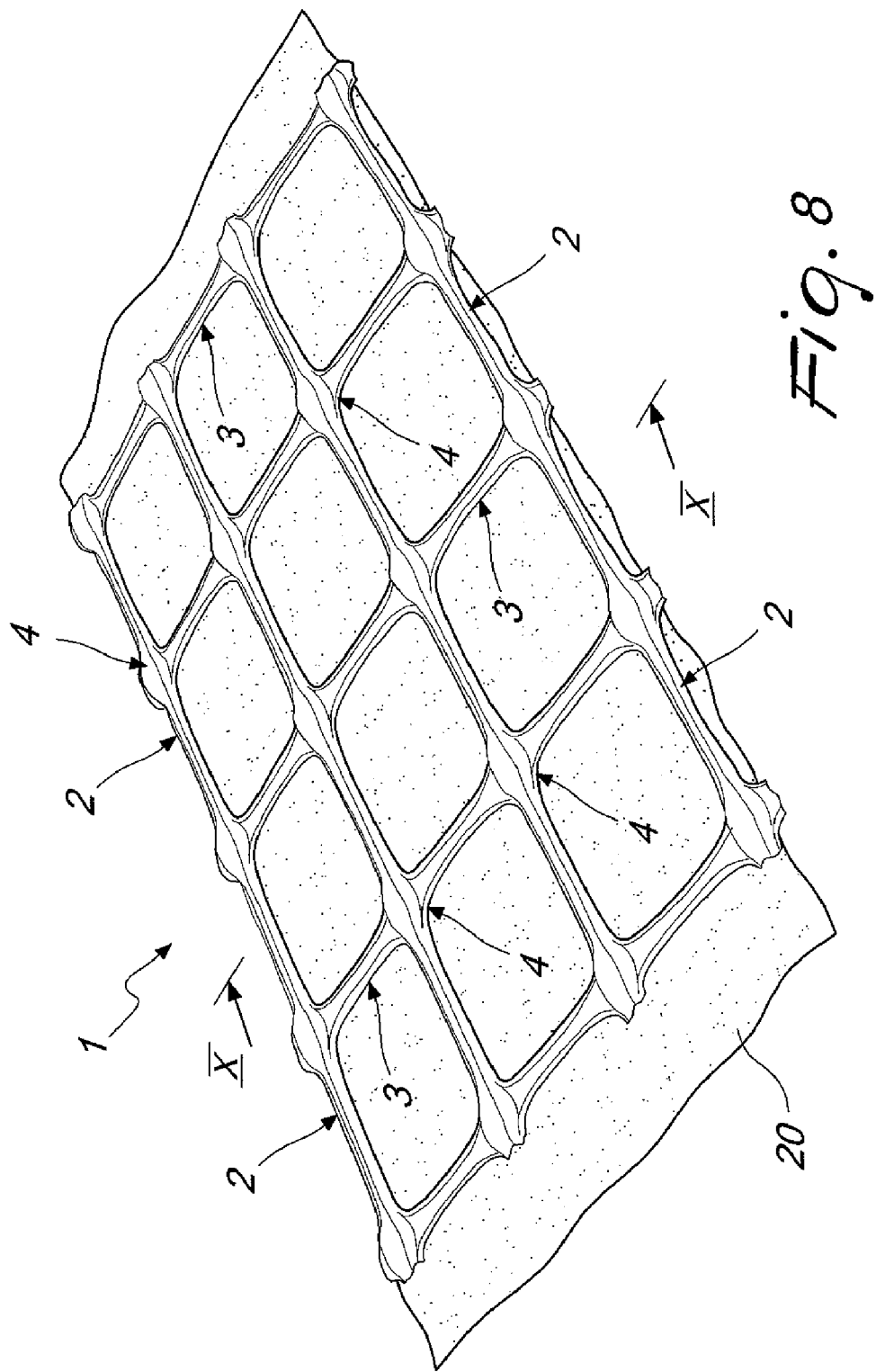
FIG. 8 is a perspective view of the sheet-like body coupled to a lower geotextile layer.
Figure 9:
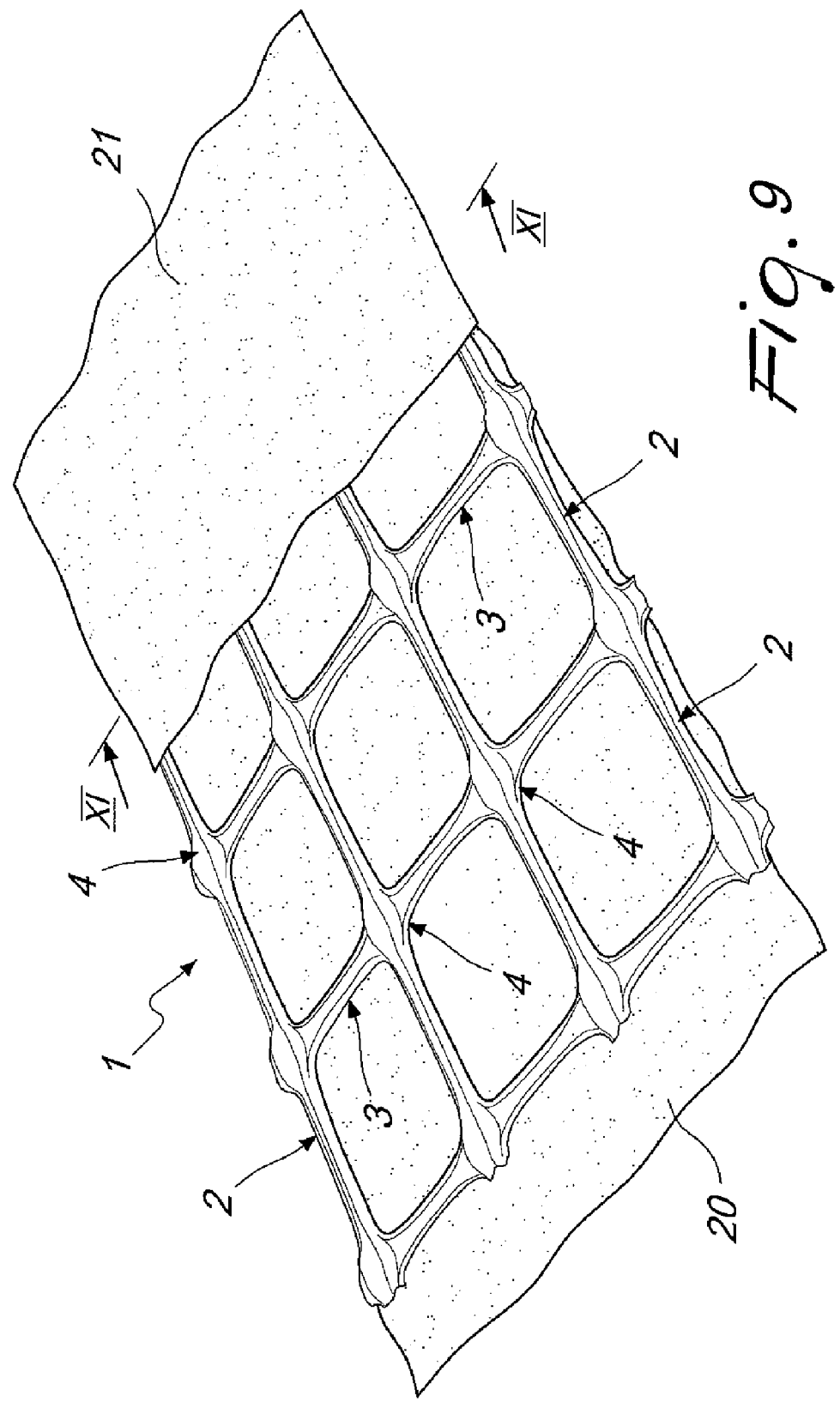
FIG. 9 is a perspective view of the sheet-like body, coupled to a lower geotextile layer and to an upper geotextile layer.

The angle α formed at the node as shown in FIGS. 3 and 4 is advantageously smaller than 90°, whereas a constructive variation is also possible which is shown in FIG. 5 and in which the angle β formed between the sides of the node and the transverse wires is slightly greater than 90°.

In the practical embodiment, the lattice-like element has openings which have a substantially regular shape with a spacing between the main wires that is comprised between 50 and 70 mm and with a spacing of the transverse wires of approximately 60 mm, whereas the aperture of the meshes can vary between 42 and 65 mm for the main wires and around 58 mm for the transverse wires.

As indicated in FIGS. 8 to 11, it is possible to apply with heat a lower geotextile layer 20, so as to combine the draining capacity of a geocomposite with the increased strength and reinforcement of the ground that is typical of the invention.

Moreover, the presence of side lateral walls of the main wires 2 which are substantially vertical and form flattened portions in an upward region makes it possible to use the invention as an element for separating different layers of soil by applying an upper geotextile layer 21, which in practice encloses the sheet-like body together with the layer 20.

The particular substantially quadrangular cross-section of the main wires 2 makes it possible to have, on the upper side of the wire, the maximum possible contact surface between the geotextiles, which are clearly separated from each other due to the uniform height of the cross-section of the sheet-like body 1.

A significant element of the invention consists in that the presence of the sharp edges at the transverse wires makes it possible to better anchor the granular material, whether consisting of sand or gravel, and therefore in extraction tests it is observed that the sharp-edged protrusions provided on the wire allow greater friction even in media such as sand for an equal mesh size with a smaller unit weight than traditional nets.

In particular with reference to the vector diagram shown in FIG. 1, where the curvature of the road surface has been exaggerated to highlight the concept, the weight P of the vehicle is divided into the component Pn of the weight that is normal to the roadbed and the component Pt, which is divided tangentially to the roadbed and is contained by the presence of the sharp edges provided on the net.

From what has been described above it is evident that the invention achieves the proposed aim and objects, and in particular the fact is stressed that it is particularly important to have provided main wires that have a quadrangular cross-section with sharp edges which allow the article to withstand stresses in a preferential direction, with the consequent possibility of saving material, and accordingly weight, in the direction that is not affected by the primary stress state.

The presence of the reinforcements along the entire extension of the main wires, without interruption at the nodes, makes it possible to keep the structure in a state of stress which is distributed ideally for the structure being considered, without having regions of discontinuity that might cause local deformations.

The invention thus conceived is susceptible of numerous modifications and variations, all of which are within the scope of the appended claims.

All the details may further be any according to requirements and to the state of the art.

The disclosures in Italian Patent Application No. MI2009A000508 from which this application claims priority are incorporated herein by reference.

What is claimed is:

1. A sheet element for reinforcing, separating and draining large structures, comprising a sheet body which has a lattice configuration with main wires and transverse wires that are stretched respectively along two mutually substantially perpendicular directions and that intersect in nodes, said main wires extending in an extrusion direction of a blank that provides said sheet body, said main wires having an upper rim and a pair of substantially vertical lateral walls extending downwardly from said upper rim at opposite ends of said upper rim, an upper pair of mutually opposed edges being arranged at said opposite ends of said upper rim where said upper rim intersects with said lateral walls, said main wires having a lower rim in regions remote from said nodes, said lateral walls intersecting said lower rim at opposite ends of said lower rim, a lower pair of mutually opposed edges being arranged at said opposite ends of said lower rim where said lower rim intersects with said lateral walls, said main wires having a lower portion in regions at said nodes which converge with said transverse wires, said main wires having at the regions at said nodes a thickness, in a direction that lies at right angles to a plane of arrangement of said sheet body, which is equal to at least three times a thickness of said transverse wires, and said main wires having at the regions remote from said nodes a thickness which is at least two times greater than the thickness of said transverse wires.

2. The sheet element according to claim 1, wherein said wires are biaxially oriented, with a stretch ratio in said two substantially mutually perpendicular directions which is comprised between 2.8 and 5.5.

3. The sheet element according to claim 1, wherein said main wires have, in a direction that is substantially perpendicular to said extrusion direction, dimensions comprised between 8×6 millimeters and 8×8 millimeters.

4. The sheet element according to claim 1, wherein said main wires have a spacing comprised between 60 and 70 mm and said transverse wires have a spacing of approximately 60 mm.

5. The sheet element according to claim 1, further comprising a lower geotextile layer, which is connected to a lower face of said sheet-like body.

6. The sheet element according to claim 1, further comprising an upper geotextile layer, which is coupled to an upper face of said sheet body.

* * * * *

UNITED STATES PATENT AND TRADEMARK OFFICE
CERTIFICATE OF CORRECTION

PATENT NO. : 8,206,060 B2  
APPLICATION NO. : 12/709804  
DATED : June 26, 2012  
INVENTOR(S) : Maggioni et al.

Page 1 of 1

It is certified that error appears in the above-identified patent and that said Letters Patent is hereby corrected as shown below:

On the Title Page

(75) The city of the first inventor should be: Barzano'

(75) The name of the second inventor should be: Cesare Beretta

Signed and Sealed this  
Fourth Day of June, 2013

Teresa Stanek Rea  
*Acting Director of the United States Patent and Trademark Office*